INVENTORS
GERALD H. TELETZKE
PAUL V. KNOPP
ALLEN H. ERICKSON

AGENT 3,697,417
HEAT TREATMENT OF SEWAGE SLUDGE
Gerald H. Telletzke, Paul V. Knopp, and Allen H. Erickson, Wausau, Wis., assignors to Sterling Drug Inc., New York, N.Y.
Continuation-in-part of application Ser. No. 861,894, Sept. 29, 1969. This application Mar. 2, 1971, Ser. No. 120,246
Int. Cl. C02c 3/00
U.S. Cl. 210—10
10 Claims

ABSTRACT OF THE DISCLOSURE

Sewage sludge is briefly heated in a continuous process to a temperature between 190° C. and about 230° C. for a period of time, up to about 240 seconds, which is inversely proportional to the temperature to which the sludge is heated and which is just sufficient to substantially improve the dewatering characteristics of the sludge, and immediately thereafter cooled thereby reducing color and BOD (biological oxygen demand) formation in the supernatant liquid.

This application is a continuation-in-part of copending application, Ser. No. 861,894, filed Sept. 29, 1969, now abandoned. This invention relates to the heat treatment of sewage sludge to improve its dewatering properties.

Heat treatment of sewage sludge to improve its dewatering characteristics is a well-known process which has been practiced commercially for many years. See, e.g., U.S. 1,116,953; 2,075,224; 2,131,711; 2,277,718; 2,847,379; and 3,155,611. The conventional process involves heating sludge at temperatures of 100° up to 180° C. for 30 minutes to several hours or days. Pilot plant treatments at slightly higher temperatures and shorter times have been reported. See Harrison, John, "Heat Syneresis of Sewage Sludges," Water and Sewage Works, May 1968, pp. 217–220, and references cited therein. However, the approach taken by the prior art generally was to heat at lower temperatures by a batch process for whatever length of time was required to achieve the desired dewaterability, thereby avoiding the more expensive equipment required for a continuous process and the problems associated therewith.

More recently continuous heat treatments have been employed to improve thermal efficiency and increase processing capacity. In general these systems have also employed prolonged holding times, i.e., 30 minutes or more.

Although the prior art heat treatment processes achieved satisfactory improvements in sludge dewatering characteristics, it created another problem, viz., markedly increased color and BOD values for the supernatant liquid. The color is only nominally affected by biological treatment and thus affects the color of the sewage plant effluent. This is significant because color and BOD value are criteria for measuring water quality and the high color and BOD value of the supernatant have been of concern to sanitary engineers considering the heat treatment of sludge to increase the sludge handling capacity of a sewage treatment plant.

From data obtained by heating sludge at holding times varying between 10 minutes and 2 hours at various temperatures, it appeared that color formation was directly proportional to temperature, i.e., the higher the temperature to which the sludge was heated to improve its dewatering properties, the higher the color value of the resultant supernatant liquid. Heating a mixture of primary and activated sludge for about 30 minutes at 150° C. gave an APHA color value of 1200; at 180° C., a color value of about 3000; at 190° C., a color value of about 4100; at 200° C., a color value of about 5000; and at 210° C., a color value of about 6200. Thus, if low color value in the supernatant liquid was desired, treatment temperatures above 180° C. were clearly contraindicated.

Regression analysis of a series of pilot plant heat treatment runs on primary and waste activated sludge in which holding times were varied from 10 minutes to 70 minutes and reactor temperatures were varied from 171° to 210° C. gave the following results.

| Variable | Regression coefficient | Standard error |
|---|---|---|
| Time | +18.4 | ±12.0 NS |
| Temperature | *+50.5 | ±7.1 |
| Raw sludge COD | +26.2 | ±33.4 NS |

*Significant to 99% confidence level.

NS: Not a significant effect.

From this data it would be concluded that over the conventional range of operation only temperature significantly affected the filtrate color.

Similarly analysis of the filtration rates for these fourteen runs showed the following effects:

| Variable | Regression coefficient | Standard error |
|---|---|---|
| Time | .0865 | ±.0694 NS |
| Temperature | *.1332 | ±.0417 |
| Feed solids | *1.424 | ±.558 |

*Significant to 99% confidence level.

NS: Not a significant effect.

Again, temperature was found to be a signficant factor affecting filtration rate. Holding time was found to not significantly affect either filtrate color or filter rate in the region of conventional operation. Contrary to the above indicated effects of holding time and temperature, it has now been found that substantial improvement in sludge dewatering characteristics can be achieved with less color formation than heretofore possible by briefly heat treating the sludge at a substantially higher temperature than conventionally employed.

SUMMARY OF THE INVENTION

According to this invention, preheated sewage sludge is briefly heated at a temperature between 190° C. and about 230° C. for a period of time up to 240 seconds which is inversely proportional to the selected temperature, thereby improving the dewatering characteristics of the insoluble solids while producing less color and BOD in the supernatant liquid.

OBJECTS OF THE INVENTION

It is an object of this invention to provide an improved process for the heat treatment of sewage sludge to improve its dewatering properties. Another object is the provision of such a process which results in less color formation in the supernatant liquid. A further object is the provision of such a process in which solubilization of the BOD of the sludge is reduced. Another object is the provision of such a process comprising an improved method for the incorporation of the soluble BOD of the supernatant liquid into a biological treatment step of the sewage treatment plant. Yet another object is the provision of such a process comprising an improved method for preheating the sludge to be heat treated by indirect heat exchange. Other objects will be apparent to those skilled in the art to which this invention pertains.

DETAILED DESCRIPTION OF INVENTION

The process of this invention involves briefly heating sewage sludge at a high temperature and cooling the sludge before excessive color values develop in the supernatant liquid.

Any sewage sludge can be employed e.g., primary, digested, activated, preferably a mixture of activated and primary sludges. Industrial as well as domestic sewage sludges can be employed. Preferred sludges are those having very high specific resistance to filtration values, e.g., above $500 \times 10^7$ sec.$^2$/g., and for all practical purposes are unfilterable on a rotary vacuum filter. Also preferred are those whose supernatant liquid has an APHA color value of less than 1,000.

Figure 1:
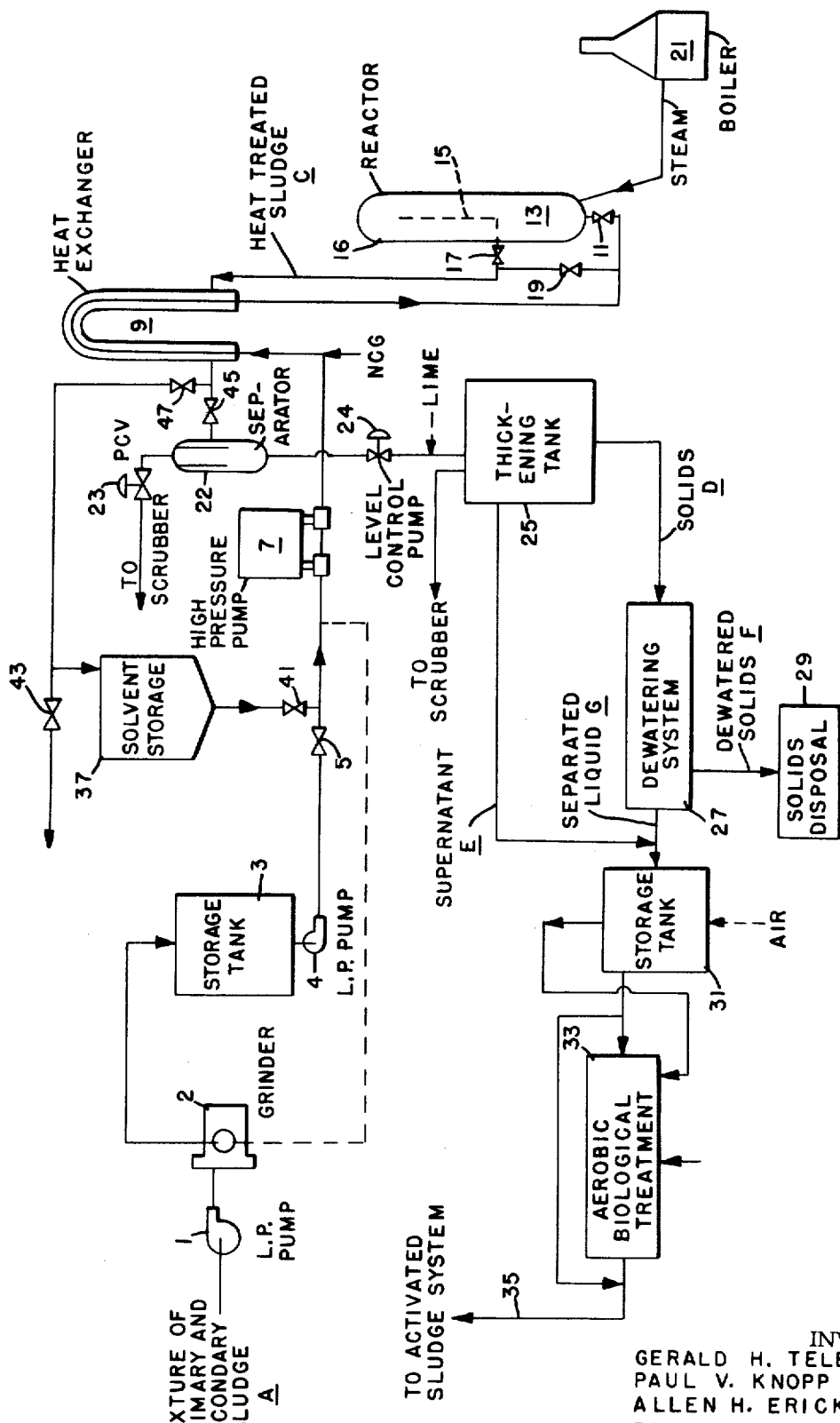
FIG. 1 is a schematic flow diagram of a sewage sludge heat treatment system employing the process of this invention.

As shown in FIG. 1, a mixture of primary and secondary sludge A is pumped by a low pressure pump 1 through a grinder 2 to produce a homogenous mixture which is then pumped to a tank 3 for storage until used. A second low pressure pump 4 pumps a stream of the stored sludge, to a high pressure pump 7 which raises the pressure of the sludge to operating pressure and pumps it through the tube side of a U-shaped counter current heat exchanger 9. The flow rate of sludge processed by the system is controlled by a variable output pump. Optionally, a non-condensable gas (NCG) is added at this juncture to improve the heat exchange efficiency of the heat exchanger. The sludge is heated in the exchanger to a temperature a few degrees below the desired final heat treatment temperature. The heated sludge enters up-flow reactor 13, where the sludge is maintained at final treatment temperature for the selected treatment time, which time is determined by the sludge pumping rate. The sludge is heated to final treatment temperature by injecting the requisite amount of steam into the reactor from boiler 21.

The heat treated sludge C flows from the reactor through overflow exit pipe 15 which is positioned below the top of reactor 13, thus providing a chamber 16 in which gases accumulate and flow as a mixture with the heated sludge out of standpipe 15. If desired, the reactor can be bypassed so that only a portion of the sludge flows through reactor by partially closing valve 17 and partially opening valve 19. The heated sludge then passes through the shell side of U-tube heat-exchanger 9 and then through valve 45 to a separator 22 which separates the gaseous phase from the liquid phase. The gaseous phase is exhausted through pressure control valve 23 which reduces its pressure to atmospheric pressure. A chemical agent, e.g. lime, alum, ferric chloride or others, can be added at the inlet of the thickening tank to further improve the characteristics of the heat treated sludge.

The cooled sludge is transferred from the separator 22, where the liquid level therein is regulated by a liquid control valve 24, to a thickening tank 25 where the insoluble solids therein are allowed to settle. The thickened sludge is then dewatered in a dewatering system 27, typically a vacuum filtration system. The supernatant E from the thickening tank 25 by-passes the dewatering system 27, thereby increasing its capacity. The dewatered solids F from the heat treated, thickened sludge D are transferred to a solids disposal system 29, e.g., an incinerator. The unbound liquid portion of the thickened sludge D, i.e., the supernatant E from the thickening tank and the separated liquid G from the dewatering system, is transferred to a temporary storage tank 31. A small stream of air can be passed through the tank to prevent the accumulation of unpleasant odors and/or the development of an anaerobic condition therein, with the exhaust air passing into the aerators of the aerobic biological treatment system 33.

All or a portion of the BOD rich effluent E and G from the heat treated sludge is then subjected to a high load aerobic biological treatment system 33 separate from the conventional aerobic biological treatment system 35 and the effluent or effluent and sludge solids from the high load biological treatment 33, which is now comparable in soluble BOD to conventional sewage is then passed to the input side of a conventional biological treatment system 35. Any portion of the effluent from storage tank 31 which is not subjected to a separate biological treatment is passed to the conventional biological treatment system 35 during periods when the BOD of the sewage going to that system is below the mean level, thereby maintaining a more constant rate of sludge formation.

Because sewage sludge tends to foul heat exchangers, the system is equipped with a solvent washing system which can be employed without shutting down the system. At periodic intervals a solvent for the material fouling the heat exchanger surfaces, e.g., caustic and/or detergent, which is stored in solvent storage tank 37 is used to clean the heat exchangers. To do this, valves 5,11, 17, and 45 are closed, thereby stopping the flow of sludge to the system, and valves 41, 47, and 19 are opened, thereby releasing solvent into the system. The solvent passes through the tube side of the heat exchanger 9, through valve 19, through the shell side of the heat exchanger 9 and then back to storage tank 37 or through valve 43 where it can be discharged into the sewage treatment system. If desired in an alternative arrangement (not shown) the separator can be by-passed and the entire sludge-gas mixture passed through control valve 24 to thickening tank 25 where the gas will be vented through a scrubber.

Figure 2:
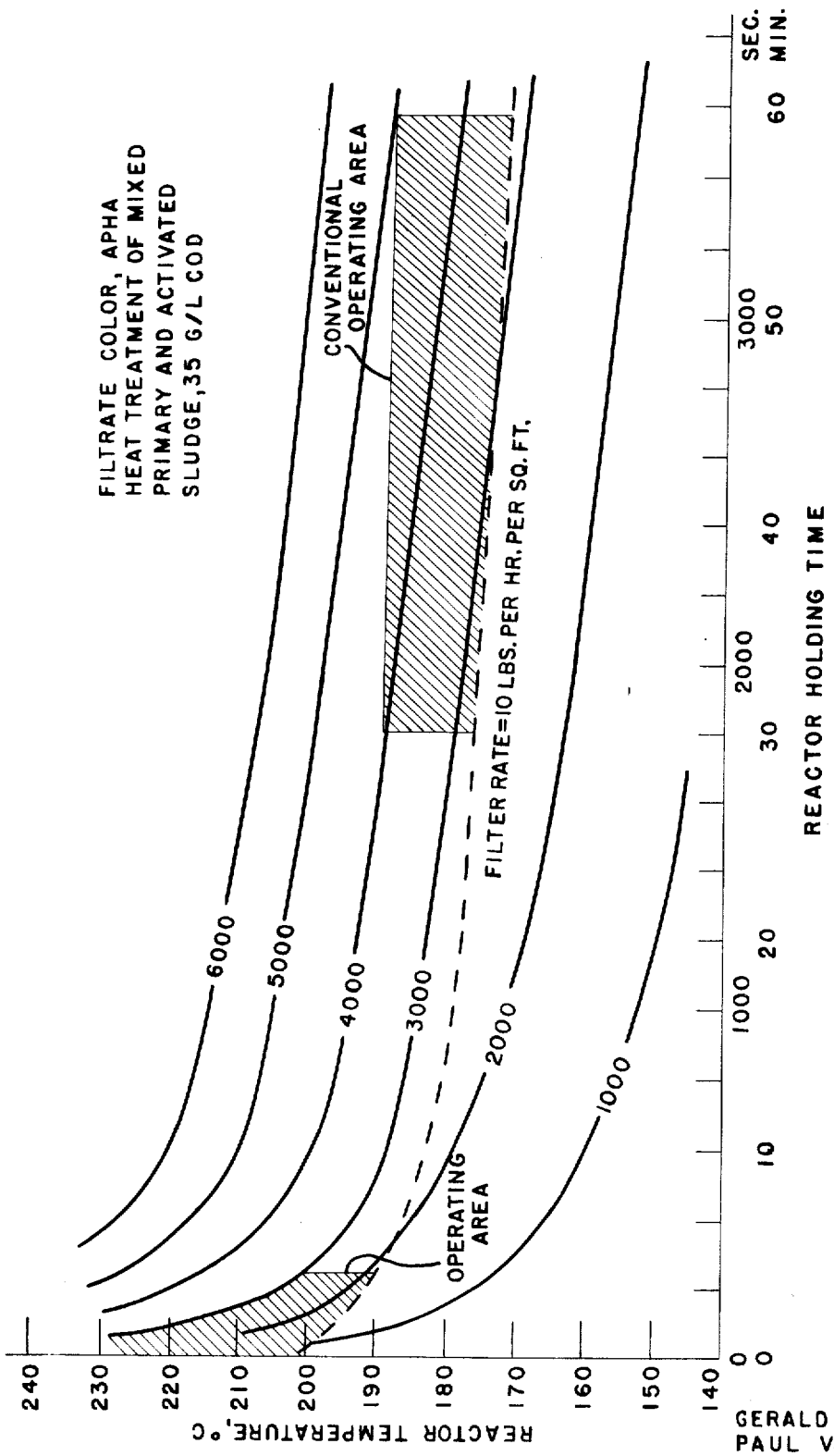
FIG. 2 is a graph showing the relationship of time and temperature to color formation and the dewatering characteristics of the sludge in the process of this invention and in conventional prior art processes.

As shown in FIG. 2, the time during which the sludge is heated is inversely proportional to the selected temperature. For example, if the sludge is heated to 210° C., it should be maintained at that temperature for about 30 seconds to ensure adequately improved dewatering characteristics but not longer than about 180 seconds to avoid excessive color production in the supernatant liquid. The higher the temperature to which the sludge is heated, the narrower the range between the minimum and maximum heating times becomes until, for all practical purposes, one cannot stay within this range if the sludge is heated to above 250° C. Below 190° C., the time required to satisfactorily improve dewatering characteristics is usually so long that excessive color values in the supernatant liquid cannot be avoided. A heating temperature of 200 to 225° C. for between 180 seconds and 15 seconds is preferred.

For the purposes of this invention, the dewatering properties of mixed primary and waste activated sludge are considered satisfactorily improved if its vacuum filtration rate (standard conditions) is at least 10 lbs. dry solids/ft.$^2$/hr. Similarly the dewatering properties of digested and activated sludge are considered satisfactorily improved if filtration rates are at least 3 lbs. dry solids/ft.$^2$/hr. Supernatant color is considered satisfactory if below about 3000 APHA color units.

Figure 3:
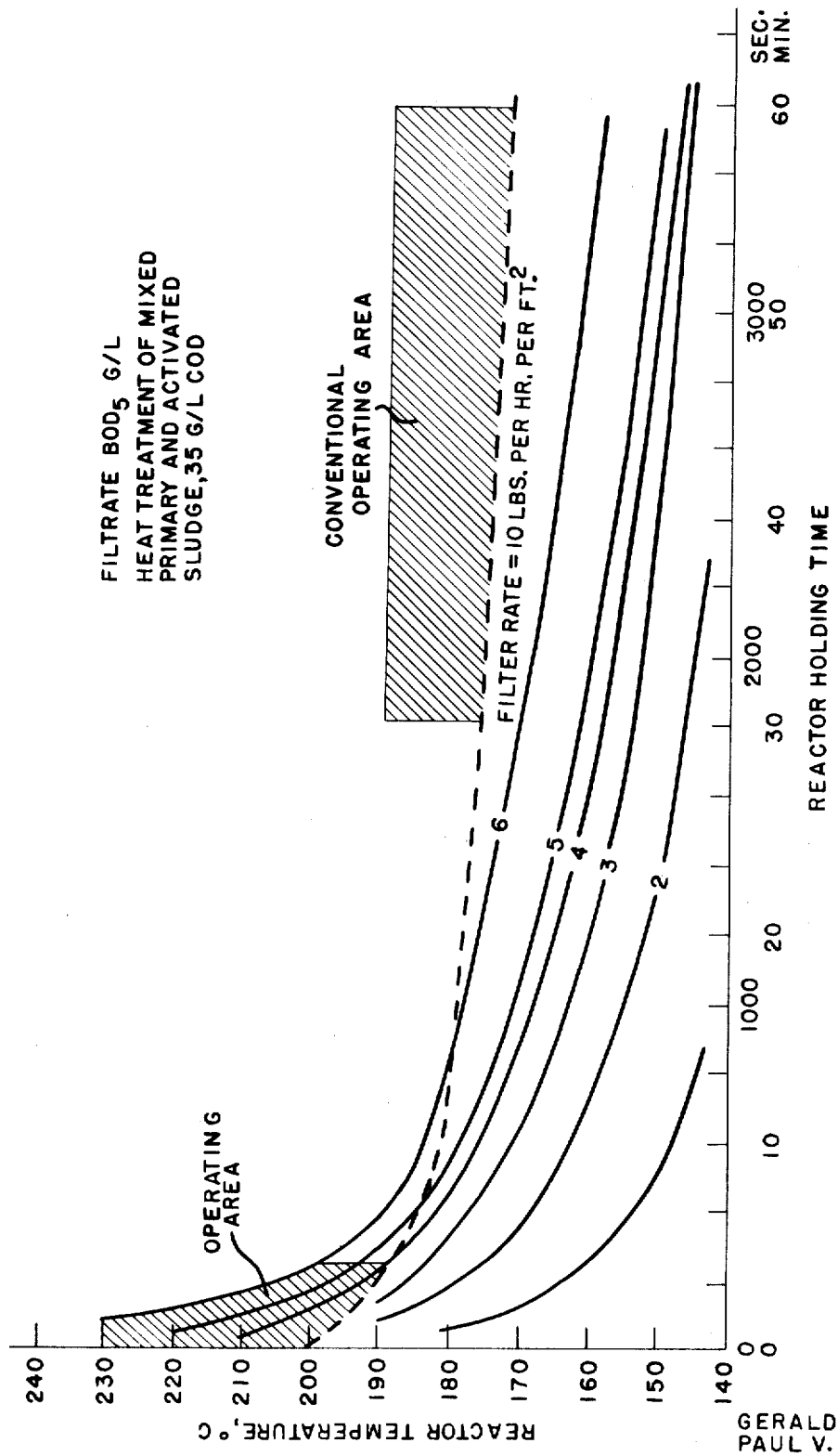
FIG. 3 is a graph showing the relationship of time and temperature to the solubilization of the BOD of the sludge in the process of this invention and in conventional prior art processes.

FIG. 3 shows the relationship of BOD solubilization to the time and temperature of the heat treatment. As shown by the cross-hatched area, conventional heat treatments result in a 5-day BOD of the supernatant liquid greater than 6 g./l. when a satisfactory improvement in filterability is achieved. Surprisingly, when following the process of this invention, the 5-day BOD of supernatant liquid is only about 2 to 6 g./l., which is a highly significant improvement because the supernatant of heat treated sludge can increase the BOD loading of the activated sludge system by as much as 20 percent.

The times shown in FIGS. 2 and 3 are the times at which the sludge is maintained in the reactor at about the temperature shown on the graphs. This is determined by dividing the volume of the reactor by the flow rate of the stream of sludge passing through the reactor. Not included is the time during which the untreated sludge is being heated in the heat exchanger and the time required to cool the heat treated sludge in the heat exchanger. The smaller the volume of the reactor relative to the volume of the heat exchanger, the more significant is this time. Generally, however, no significant increase in the color of the supernatant occurs after the sludge passes from the reactor to the heat exchanger.

The solids concentration of the sludge is not critical but concentrations between 2 and 8 percent are preferred.

The sludge velocity through the heat exchangers is preferably between about 3 and 7 feet per second. The residence time of the sludge in the heat exchangers both before and after the heat treatment varies from about 30 seconds to about 15 minutes proportionally with the size of the equipment and the length of the tubes of the heat exchangers, during which time the sludge is heated from a temperature below 100° C. to a temperature above 150° C. but below 190° C. The sludge is not appreciably affected during its passage through the heat exchangers, that is, there is no appreciable solubilization of organic matter or change in filtration characteristics in the sludge until the sludge reaches reactor temperature. Therefore, the dwell time of the sludge in the heat exchangers does not cause any substantial increase in the effective heat treatment time.

To illustrate that the sludge characteristics are substantially unaffected by the period of time in the heat exchangers a series of experiments were carried out to simulate the heat up and cool down without exposure to the high reactor temperature.

A mixture of waste activated and primary sludge was placed in an autoclave and heated from room temperature to 212° C. at the rate of 0.3° C. per second (about 10 minutes residence time) and then immediately cooled at the rate of 0.6° C. per second to simulate the heat up and cool down occurring in the heat exchangers and in which no reaction time was provided.

The material was removed and the specific filtration resistance (SFR) was found to be $1175 \times 10^7$ sec.$^2$/gram. Ordinarily a value of $40 \times 10^7$ sec.$^2$/gram is necessary to provide satisfactory filtration. The sludge before treatment had an initial specific filtration resistance of $5360 \times 10^7$ sec.$^2$/gram.

Sludge velocity through the reactor is preferably between 5 and 10 feet per minute. The reactor temperature is maintained between about 185° and 230° C., preferably between 190° and 210° C. The dwell time in the reactor is maintained between 180 and 240 seconds at 190° C. and between 30 and 180 seconds at 210° C. The most preferred reactor temperature is about 205° C. and the sludge is preferably maintained at that temperature at least 30 seconds but less than 240 seconds.

Unless air is introduced into the sludge prior to heating, or into the reactor to reduce odor, the heat treatment is carried out in substantial absence of oxygen. However, because its presence significantly improves heat transfer coefficient and reduces clogging of the heat exchangers and reduces the odor of the heat treated sludge a small amount of air, e.g., about 0.1 to 1 standard cubic foot per gallon sludge, is preferably mixed with the unheated sludge prior to its entering the heat exchangers. If only odor improvement is desired, the air can be injected into the reactor. Although odor is improved, it is not due to a reduction in the chemical oxygen demand because this volume is too small to significantly affect the COD of the sludge, i.e., COD is reduced at most only about 1–3 percent. The change in physical and chemical characteristics of the sludge is thus not caused to any appreciable extent by wet-air oxidation. If only higher heat exchange efficiency is desired, another gas, e.g., carbon dioxide, nitrogen, or a mixture of the two can be used instead of air.

In operation, from about 200 to about 300 B.t.u per gallon of sludge treated must be supplied thereto to maintain the selected reactor temperature. This additional heat can be supplied by steam injected directly into the reactor. The additional heat can also be supplied by indirect heat exchange with other hot fluids which are heated in a separate heater.

As described above, in a preferred embodiment the drainage liquor from the heat treated sludge can be maintained in a tank to which air is supplied to aerate the liquid. Inoculation of the aerated liquid with activated sludge or with a specific sludge forming organism which produces a readily settleable sludge, will result in a high load biological treatment system which can rapidly reduce the BOD of the liquor down to normal sewage levels or lower. For example, with a BOD loading of 4 lb. BOD/day/lb. MLVSS or lower a 90–95 percent reduction in BOD can be achieved i.e., from 3 g./l. down to 0.3 g./l. or lower. Such a system can be operated on a fill and draw principle in which the liquor is aerated in the presence of the sludge-producing organisms as it is received but without overflow and once a day is allowed to settle. The treated supernatant is decanted to the activated sludge system, preferably when the BOD of the sewage influent is lowest. A portion of the accumulated solids is withdrawn and mixed with other sludge solids for heat treatment.

The high load biological treatment system can also be operated on a continuous flow basis with the average dwell time being sufficient to maintain the overflow liquid at an acceptably low value. Air is supplied to the system at a rate adequate to achieve this reduction. The overflow is then transferred to the influent end of the activated sludge system.

EXAMPLE 1

A mixture of primary sludge and thickened activated sludge containing 22 g./l. insoluble solids was pumped at the rate of 3 gal./min. through a heat exchanger and reactor as shown in FIG. 1 having capacities of 2.5 gal. (tube side) and 1.8 gal., respectively, at a pressure of 315 p.s.i. (gauge). Sufficient steam was injected into the reactor to maintain it at 210° C. and provide the requisite 80° $\Delta^t$ for the heat exchanger. The velocity of the sludge in the tubes of the heat exchanger was 3.5 ft./sec. and 16 ft./min. in the reactor, thus providing dwell time in the reactor of 30 seconds. The cooled sludge had a vacuum filtration rate of 15 lbs. dry solids/ft.$^2$/hr. Only a small portion of the insoluble solids was solubilized. The supernatant liquid had an APHA color value of 1200 and a BOD of 2.2 g./l. Conventionally heated sludge has a comparable filtration rate. However, the supernatant BOD and APHA color values are 5 to 6 g./l. and 3000–4000, respectively.

EXAMPLE 2

Under comparable conditions, pumping a mixture of primary and secondary sludge containing 40 g./l. insoluble solids at a rate of 60 gal./min. through a heat exchanger having a 50 gal. (tube side) and 30 gal. (shell side) capacity at pressure of 450 p.s.i. and at a velocity of 6 ft./sec. and 10 ft./sec., respectively, and then through a reactor maintained by steam injected therein at a rate which maintains the reactor temperature at 210° C. and a $\Delta^t$ in the heat exchanger of 18° C., the reactor being of a capacity which provides a dwell time at that temperature of 30 seconds and then through the shell side of the heat exchanger produced a sludge having a vacuum filtration rate of 15 lbs. dry solids/ft.$^2$/hr., a supernatant BOD of 4.0 g./l. and APHA color value of 2000. Such sludge heat treated conventionally has an effluent BOD of 7 g./l. and an APHA color values of 4000.

EXAMPLE 3

In a run otherwise similar to Example 1, with a sludge flow at 150 gallons per hour, 1.25 standard cubic feet of air per gallon of sludge was mixed with the sludge prior to entering the heat exchanger. This amount of air was insufficient to significantly alter the BOD of the sludge by wet air oxidation, i.e., it reduced it by only about 1 to 3 percent. The sludge had a bulk velocity of 1.36 f.p.s. at the tube inlet end and 1.79 f.p.s. at the tube outlet end, compared with 0.93 and 1.01, respectively, in the absence of the air. The average heat transfer coefficient in the absence of air was 70 and 108.5 in the presence of air, an increase of 55 percent. Even at 400 g.p.h., an increase in heat transfer coefficient from 106.5 to 142.5, a 34 percent increase, was achieved. The odor of the heat treated sludge was substantially better than that of sludge heated in the same way in the absence of air.

In some instances, particularly with heavy sludges, settling can occur in heat exchangers which leads to blockage problems. The addition of the air increases mixing in the heat exchangers and prevents this as well as improving the heat transfer coefficient. The improved heat transfer coefficient permits the use of a shorter heat exchanger. Thus the same amount of heat can be transferred with negligible increase in head loss.

EXAMPLE 4

As in Example 1, a mixture of primary sludge and thickened activated sludge was pumped at the rate of 125 gallons per minutes through a heat exchanger and reactor as shown in FIG. 1 having capacities of 1637 gallons (tube side) and 375 gallons, respectively at a pressure of 400 p.s.i. (gauge), Sufficient steam was injected into the reactor to maintain it at 205° C. and provide the requisite 25° $\Delta^t$ for the heat exchanger. The velocity of sludge in the tubes of the heat exchanger was 5.8 ft./sec. and 10 ft./min. in the reactor, thus providing a dwell time in the reactor of 180 seconds. The cooled sludge had a vacuum filtration rate of 10 lbs. dry solids/ft.² hr. The supernatant liquid had an APHA color value of 1100 and a BOD of 4800 mg./l. Conventionally heated sludge has a comparable filtration rate. However, the supernatant color and BOD values are 4800 and 5 to 6 g./l. respectively.

EXAMPLE 5

Under conditions otherwise similar to Example 4, 1.4 standard cubic feet of air per gallon of sludge was mixed with the sludge prior to entering the heat exchangers. The sludge had a bulk velocity of 9.9 f.p.s. at the tube inlet and 15.17 f.p.s. at the tube outlet end compared with 5.1 and 5.2 respectively, in the absence of air. The average heat transfer coefficient in the absence of air was 150 and 200 in the presence of air, an increase of 33.3 percent.

We claim:

1. A process for reducing color formation and solubilization of BOD in the heat treatment of sewage sludge to improve its dewatering characteristics which comprises the steps of
   (a) preheating a continuous stream of sewage sludge under pressure from a temperature below 100° C. to a temperature above 150° C. but below 190° C. by indirect countercurrent heat exchange with a continuous stream of heated sludge;
   (b) immediately thereafter rapidly heating the preheated sludge for up to about 240 seconds at a temperature between 190° and about 230° C., the heating period being inversely proportional to the selected temperature and just sufficient to increase the filterability of the sludge to acceptable levels, the amount of oxygen in the system being less than that required to reduce the chemical oxygen demand of the sludge by 3 percent;
   (c) immediately thereafter, cooling the heated sludge to a temperature below 100° C. by indirect countercurrent heat exchange with a stream of unheated sludge in accordance with step (a).

2. A process according to claim 1 wherein the sludge is heated to a temperature between 200° and 225° C. for a period of time between about 180 seconds and 15 seconds.

3. A process according to claim 2 wherein the sludge is heated to about 210° C. for about 30 seconds.

4. A process according to claim 1 wherein the sewage slduge is a mixture of primary and activated sludge.

5. A process according to claim 1 which comprises the steps of storing the heat treated sludge and periodically returning the supernatant liquid portion of the stored sludge to the input end of a secondary biological sewage treatment system during a low-load period of the day.

6. A process according to claim 5 wherein the secondary biological sewage treatment system is an activated sludge or trickling filter system.

7. A process according to claim 6 which comprises the steps of passing a stream of air through the heat treated sludge during its storage period and then through the aeration system of the activated sludge system.

8. A process according to claim 1 wherein the sludge is heat treated in an elongate heat treatment zone through which the sludge travels vertically upwardly to an exit positioned below a gas filled area which acts as a liquid level regulator and pressure surge control.

9. A process according to claim 1 wherein the sludge to be heat treated is preheated as a mixture with an amount from about 0.1 to 1 cubic foot of a non-condensable gas per gallon of sludge which increases substantially the efficiency of the heat exchange from the heat treated sludge to the unheated sludge.

10. A process according to claim 9 wherein the non-condensable gas is air.

References Cited

UNITED STATES PATENTS

| 3,155,611 | 11/1964 | Porteous | 210—86 |
| 3,256,179 | 6/1966 | Teletzke et al. | 210—11 X |
| 3,272,740 | 9/1966 | Gitchel et al. | 210—63 |
| 3,335,082 | 8/1967 | Ullrich | 210—15 |
| 3,507,788 | 4/1970 | Cole et al. | 210—71 X |

REUBEN FRIEDMAN, Primary Examiner

T. G. WYSE, Assistant Examiner

U.S. Cl. X.R.

210—56, 63, 71

UNITED STATES PATENT OFFICE
CERTIFICATE OF CORRECTION

Patent No. 3,697,417 (SN 120,246)    Dated October 10, 1972

Inventor(s) Gerald H. Teletzke, Paul V. Knopp & Allen H. Erickson

It is certified that error appears in the above-identified patent and that said Letters Patent are hereby corrected as shown below:

Column 1, in heading, "Telletzke" should read --Teletzke--.

Signed and sealed this 8th day of May 1973.

(SEAL)
Attest:

EDWARD M. FLETCHER, JR.
Attesting Officer

ROBERT GOTTSCHALK
Commissioner of Patents